United States Patent
Leske et al.

(10) Patent No.: US 8,204,267 B2
(45) Date of Patent: Jun. 19, 2012

(54) EARPHONE AND HEADSET

(75) Inventors: Olaf Leske, Langenhagen (DE); Olav Nisse, Hildesheim (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 385 days.

(21) Appl. No.: 12/489,790

(22) Filed: Jun. 23, 2009

(65) Prior Publication Data

US 2009/0323978 A1  Dec. 31, 2009

(30) Foreign Application Priority Data

Jun. 26, 2008  (DE) .......................... 10 2008 030 497

(51) Int. Cl.
H04R 25/00  (2006.01)
(52) U.S. Cl. .................. 381/374; 381/378; 381/379
(58) Field of Classification Search .................. 381/309,
381/330, 370, 374, 376, 377, 378, 379, 381,
381/383, 71.6, 72; 379/430; 181/129; 2/209
See application file for complete search history.

(56) References Cited

U.S. PATENT DOCUMENTS

| | | |
|---|---|---|
| 1,546,567 A | 7/1925 | Childress |
| 1,552,593 A | 9/1925 | Childress |
| 1,649,551 A | 11/1927 | Smith |
| 3,193,841 A | 7/1965 | Haluska |
| 3,325,824 A | 6/1967 | Donegan |
| 3,381,559 A | 5/1968 | Lefever et al. |
| 3,447,160 A | 6/1969 | Teder |
| 3,682,268 A | 8/1972 | Gorike |
| 3,787,894 A | 1/1974 | Goodman, Jr. |
| 4,259,747 A | 4/1981 | Taesler et al. |
| 4,409,442 A | 10/1983 | Kamimura |
| 4,783,822 A * | 11/1988 | Toole et al. .................. 381/379 |
| 5,293,647 A | 3/1994 | Mirmilshteyn et al. |
| 6,385,325 B1 * | 5/2002 | Nageno et al. ............... 381/374 |
| 6,711,273 B2 * | 3/2004 | Bebenroth .................... 381/379 |

FOREIGN PATENT DOCUMENTS

| | | |
|---|---|---|
| DE | 2132817 A | 1/1972 |
| DE | 3118294 C2 | 3/1982 |
| DE | 10310084 A1 | 9/2004 |
| EP | 1638364 A2 | 3/2006 |

* cited by examiner

Primary Examiner — Huyen D Le
(74) Attorney, Agent, or Firm — Kilpatrick Townsend & Stockton LLP

(57) ABSTRACT

There is thus provided an earphone having a hoop band (100) for receiving at least one electroacoustic reproduction transducer. The hoop band has at least two hoop band portions (110, 120) which respectively include an angle, wherein at least two of the hoop band portions (110, 120) are rotatably connected together. The hoop band also has at least one adjusting unit (20) for adjusting and fixing the angle, wherein the adjusting unit is coupled to the first and second hoop band portions (110, 120).

11 Claims, 2 Drawing Sheets

EARPHONE AND HEADSET

CROSS-REFERENCE TO RELATED APPLICATIONS

This application claims priority to German Patent Application No. 10 2008 030 497.2, filed Jun. 26, 2008, the disclosure of which is herein incorporated by reference in its entirety.

The present invention concerns an earphone and a headset.

BACKGROUND

Headphones and headsets in which the hoop band contact pressure force is adjustable have long been known. Hereinafter the term hoop band contact pressure force is intended to denote that force with which the ear pads are pressed against the head when the headphones or headset is fitted. In typical configurations that force can be adjusted by the provision of a possible way of altering the geometry of the hoop band or the coupling between the hoop band and the ear pads.

U.S. Pat. No. 1,649,551 describes headphones in which a flexible, one-part head hoop band is connected at both ends to one of two ear pads by way of a respective adjustable rotary joint. The spacing between the two ear pads and thus the hoop band contact pressure force can be varied by adjustment of those rotary joints. It will be noted however that this approach does not allow comfortable operation and does not permit easy adjustability when the headphones are in place.

U.S. Pat. No. 3,447,160 discloses headphones in which a C-shaped spring integrated in a one-piece head hoop band is more or less greatly stressed by way of an adjusting screw mounted to the apex of the head hoop band, to adjust the hoop band contact pressure force. A disadvantage in this case however is the complicated structure as the hoop band must be in the form of a deformable hollow body. In addition the adjustment range in which the hoop band contact pressure force can be varied is relatively slight.

U.S. Pat. No. 4,783,822 describes headphones in which two of the ends of a two-part head hoop band can be displaced with a translatory movement relative to each other. In that way the spacing between the two ear pads can be varied to adjust the hoop band contact pressure force.

SUMMARY

Therefore the object of the present invention is to provide headphones and a headset which permits improved adjustability of the hoop band contact pressure force.

Thus there is provided an earphone having a hoop band for carrying at least one electroacoustic reproduction transducer. The hoop band has at least two hoop band portions which respectively include an angle, wherein at least two of the hoop band portions are rotatably connected together. The hoop band also has at least one adjusting unit for adjusting and fixing the angle, the adjusting unit being coupled to the first and second hoop band portions.

The invention concerns the notion of providing an earphone in which the geometry of a multi-part hoop band is variable by adjusting and fixing the angle between at least two rotatably connected hoop band portions. In that case the rotatable connection can be for example in the form of a rotary joint. With a predetermined spacing between the ear pads which is determined by the width of the head the hoop band contact pressure force acting on the head can be altered by adjustment of the angle. Adjusting and fixing the angle ensures that the set hoop band contact pressure force is maintained even when the earphone is being worn.

In accordance with an aspect of the invention the unit for adjusting the angle has means for applying a torque. Those torque application means are disposed on the rotatably interconnected hoop band portions and act as levers, by way of which the torque acts on the rotary connection.

In accordance with a further aspect of the invention the means for applying the torque have portions for carrying an adjusting element which couples the means together. Coupling of the means permits easier operability insofar as the hoop band contact pressure force can be adjusted with one hand merely by actuating the adjusting element.

In accordance with a further aspect of the invention the adjusting element is in the form of an adjusting screw which acts together with the rotary connection to adjust the angle.

In accordance with an aspect of the invention the adjusting screw has two lateral actuating portions for rotation of the adjusting screw. In that way the earphone can be easily reached and operated both with the right hand and also with the left hand.

In accordance with a further aspect of the invention the adjusting screw has a central actuating portion for rotation of the adjusting screw. It is possible in that way to achieve a smaller structural size.

In accordance with still a further aspect of the invention the adjusting element is in the form of an electrically operable linear actuator. Using the electrically operable linear actuator makes it possible to control adjustment of the angle. In addition the linear actuator can be regulated or controlled in dependence on sensors which measure the contact pressure force.

Further aspects of the invention are subject-matter of the appendant claims.

BRIEF DESCRIPTION OF THE DRAWINGS

The advantages and embodiments by way of example of the invention are described in greater detail hereinafter with reference to the drawings in which.

DETAILED DESCRIPTION

Figure 1:
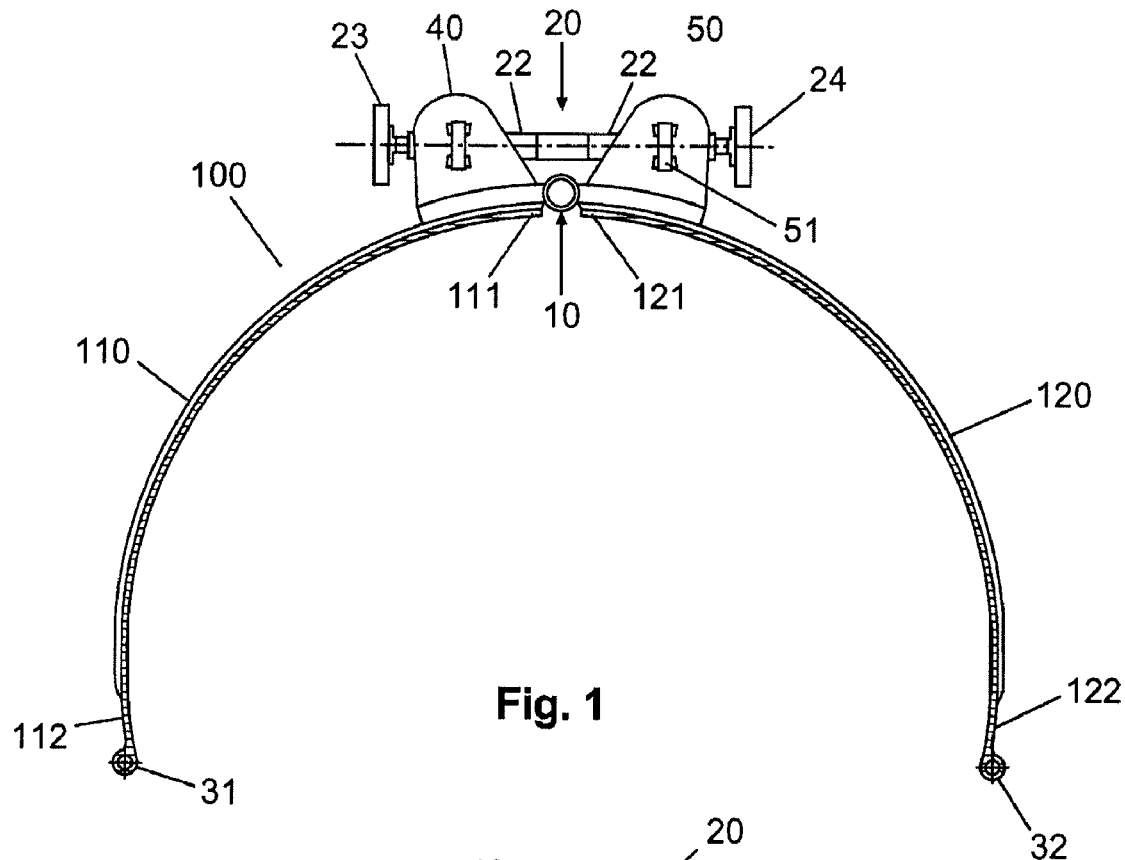
FIG. 1 shows a diagrammatic front view of an earphone according to a first embodiment.

FIG. 1 shows a diagrammatic front view of an earphone according to a first embodiment. The headphones have a hoop band 100 formed by at least a first hoop band portion 110 and a second hoop band portion 120. The first hoop band portion 110 is rotatably connected at its first end 111 to the first end 121 of the second hoop band portion 120 by way of a rotary joint 10. The second end of the first hoop band portion 110 and the second end of the second hoop band portion 120 have receiving units 31 and 32 for fixing ear pads (not shown). The two hoop band portions 110 and 120 include a first angle which can be specified for example by means of the tangent which can be defined at the respective ends 111 and 121.

In addition the first end 111 of the first hoop band portion 110 and the first end 121 of the second hoop band portion 120 are connected together by way of an adjusting unit 20 for adjusting the first angle.

In accordance with the first embodiment the adjusting unit 20 for adjusting or altering the angle has two torque application means 40 and 50 for applying a torque. The first torque application means 40 is formed by a first projection fixed to the first end 111 of the first hoop band portion 110, while the second torque application means 50 is formed by a second projection fixed to the first end 121 of the second hoop band portion 120. The two projections 40 and 50 are coupled together by way of an adjusting element 20 which here is in the form of an adjusting screw.

The illustrated adjusting screw 20 has two oppositely rotated screwthreads 21 and 22. The first screwthread 21 is received by a first portion 41 for receiving the adjusting element, which is supported mounted tiltably in the first projection 40. The second screwthread 22 is received by a second portion for receiving the adjusting element 51 which is supported mounted tiltably in the second projection 50.

The adjusting screw 20 further has two lateral actuating portions 23 and 24 for rotation of the screw. In dependence on the direction of rotation the first angle can be altered so that, with a predetermined spacing between the hoop band ends 112 and 122 that is determined by the width of the head, the hoop band contact pressure force changes.

By virtue of the frictional force acting between the screwthreads 21 and 22 and the respective components for receiving the adjusting element 41 and 51, the first angle adjusted by way of the adjusting screw 20 remains fixed, even when the headphones are in place.

Figure 2:
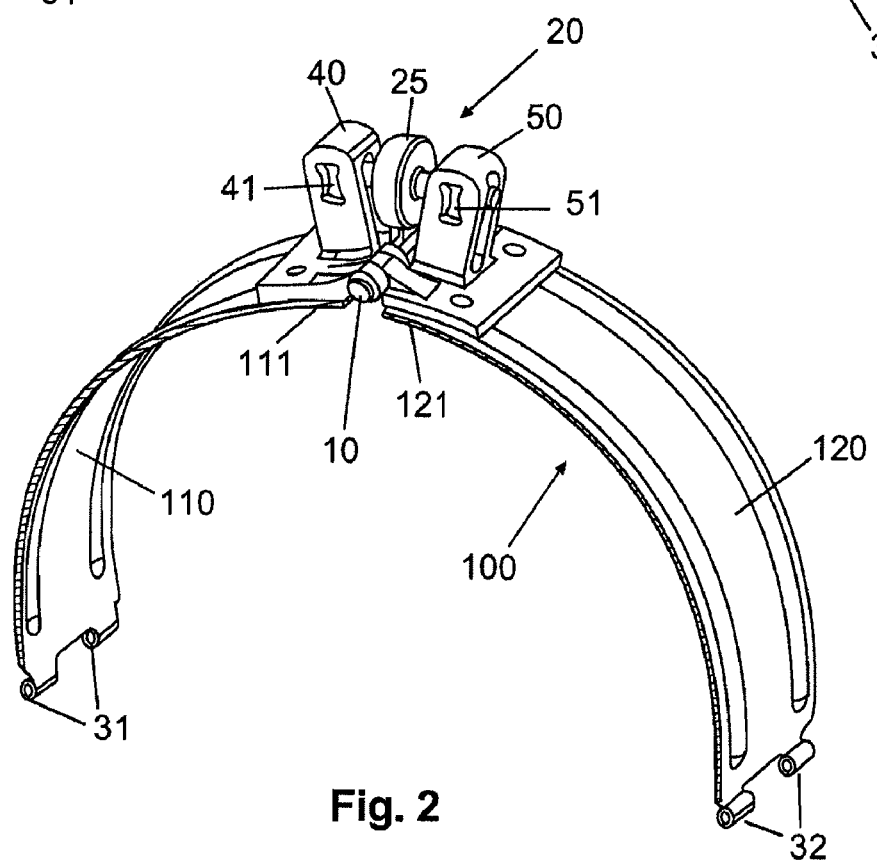
FIG. 2 shows a perspective view of an earphone according to a second embodiment.

FIG. 2 shows a perspective view of an earphone in accordance with a second embodiment. The earphone in the second embodiment also has a hoop band 100 having a first and a second hoop band portion 110, 120 connected together by way of a rotary joint 10. The first and second hoop band portions 110, 120 predetermine a first angle. As in the first embodiment the adjusting unit for adjustment of the angle is provided by a first projection 40 fixed to the first end 111 of the first hoop band portion 110 and a second projection 50 fixed to the first end 121 of the second hoop band portion 120. The two projections 40 and 50 are also coupled together by way of an adjusting screw 20.

It will be noted however that the adjusting screw 20 in accordance with the second embodiment here has a central actuating portion 25 disposed centrally between the projections 40 and 50. In dependence on the direction of rotation the first angle between the first and second hoop band portions can be altered so that, with a predetermined spacing between the hoop band ends 112 and 122 that is determined by the width of the head, the hoop band contact pressure force changes.

By virtue of the frictional forces acting between the screwthreads 21 and 22 and the respective components for receiving the adjusting element 41 and 51, the first angle set by way of the adjusting screw 20 is maintained fixed, even when the headphones are in place.

Figure 3:
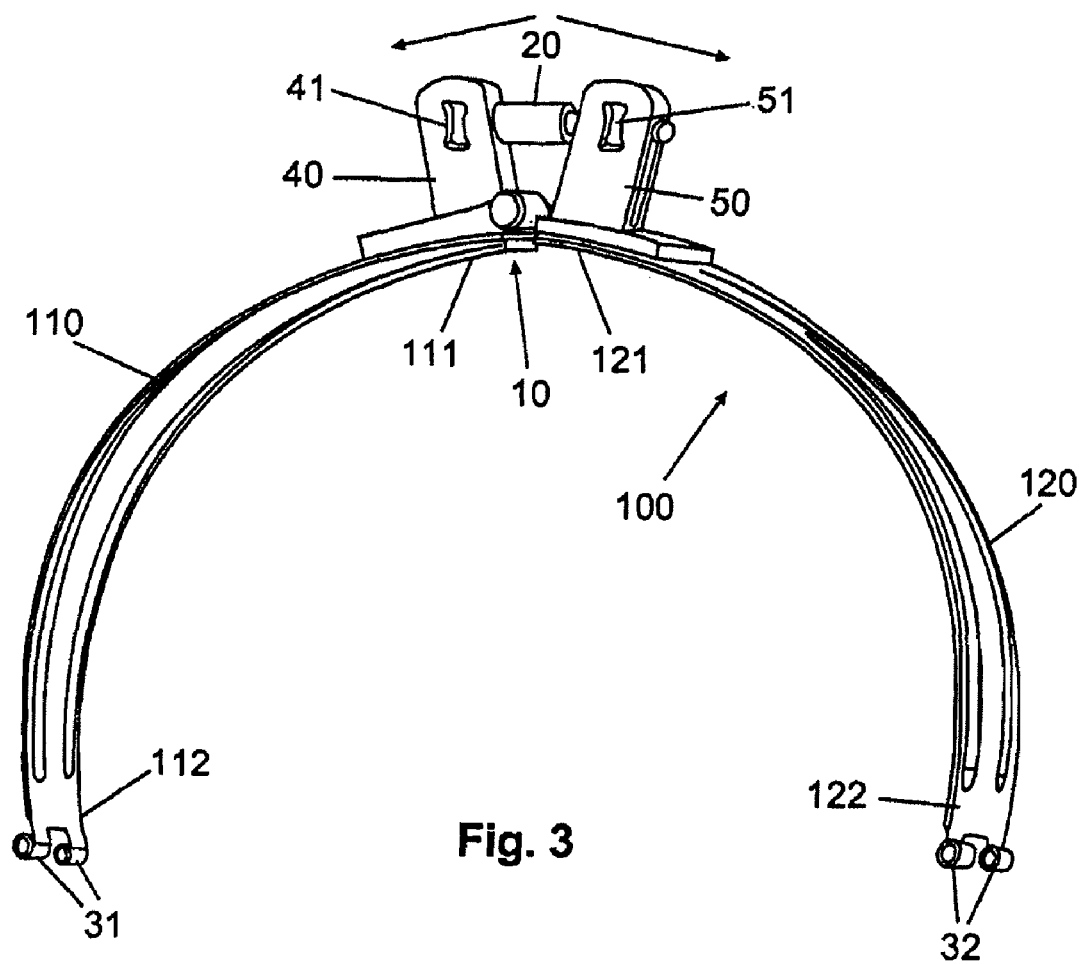
FIG. 3 shows a perspective view of an earphone according to a third embodiment.

FIG. 3 shows a perspective view of an earphone according to a third embodiment. The earphone has a hoop band 100 having a first and a second hoop band portion 110, 120 connected together by way of a rotary joint 10 and defining a first angle.

As in the first and second embodiments the adjusting unit for adjusting the first angle is provided by a first projection 40 fixed to the first end 111 of the first hoop band portion 110 and a second projection 50 fixed to the first end 121 of the second hoop band portion 120. Unlike the case with the first and second embodiments however the two projections 40 and 50 are not coupled together by way of an adjusting screw but by way of an electrically operable linear drive. In dependence on the degree of deflection of the linear drive the first angle can be altered so that, with a predetermined spacing between the hoop band ends 112 and 122 that is determined by the width of the head, the hoop band contact pressure force alters.

The angle set by way of the linear drive 20 between the hoop band elements is fixed even when the headphones are in place.

Figure 4:
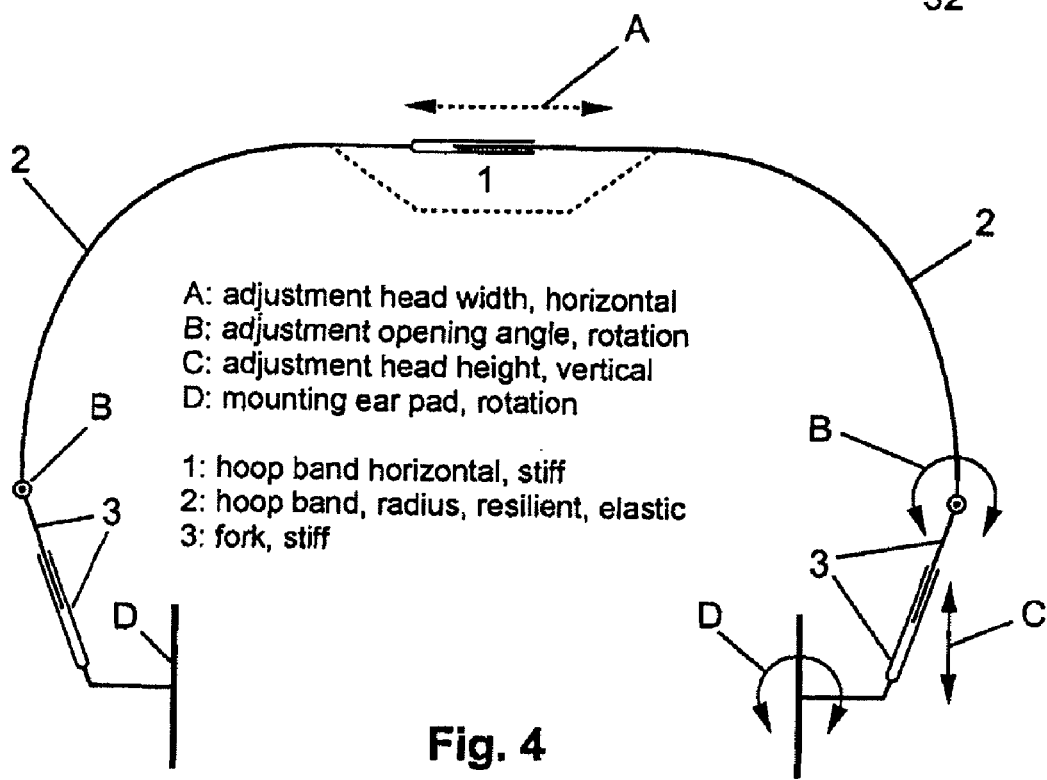
FIG. 4 shows a diagrammatic view of an earphone according to a fourth embodiment.
Figure 1:
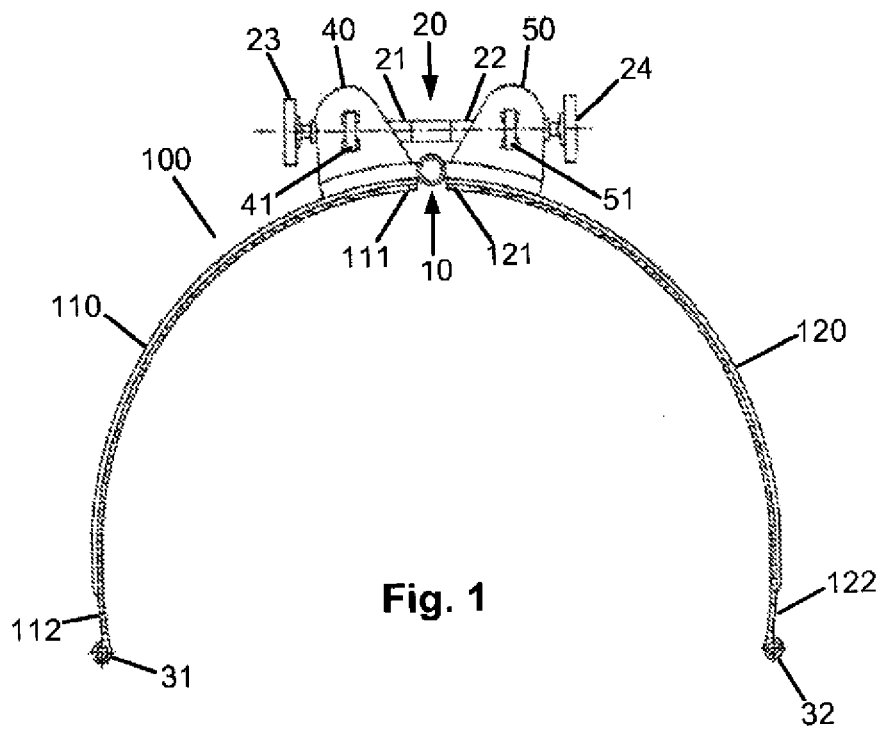
Figure 2:
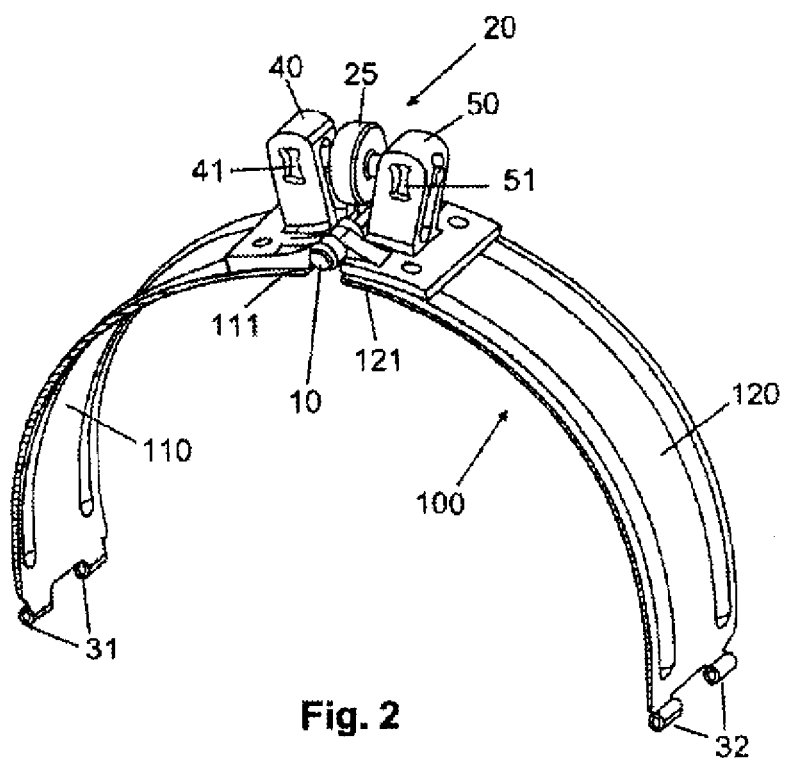

FIG. 4 shows a diagrammatic view of an earphone according to a fourth embodiment. The earphone has a first and a second hoop band portion 2 which are coupled together by way of an adjusting means 1. The two hoop band portions 2 are respectively coupled by way of a rotary joint B to a further hoop band portion 3. The hoop band portion 3 can be displaced with a translatory movement. A mounting for an ear pad can be provided at the free end of the respective hoop band portions 3. That mounting can be of a rotatable configuration.

Thus the earphone can be displaced with a translatory movement in the region A to adapt the earphone to the width of the head of the wearer. The angle of opening can be adjusted by the rotary joints B. A vertical adjustment can be effected by the hoop band portions 3 to adapt the earphone to the height of the head of the wearer.

Preferably the hoop band in the region 1 is horizontal and rigid. The hoop band portions 2 involve a radius and are of a resilient and/or elastic nature. The hoop band portions 3 can be in the form of forks and can also be stiff.

A fifth embodiment of the invention is based on one of the first through fourth embodiments, but in this case there is provided a headset instead of an earphone. In this case a microphone is provided on the head band. The headset has at least one ear pad.

A sixth embodiment of the invention is based on one of the first through fourth embodiments, but in this case passive ear protection is provided. In this arrangement it is possible to dispense with an electroacoustic reproduction transducer.

Hereinafter the expression hoop band contact pressure force is intended to denote that force with which the ear pads are pressed against the head when the headphones or headset is fitted.

The invention claimed is:

1. An earphone comprising:
   a hoop band for receiving at least one electroacoustic reproduction transducer having at least a first and a second hoop band portion which are respectively arranged at a first angle relative to each other,
   wherein at least the first and the second hoop band portions are rotatably connected together by means of a rotary joint, and
   at least one adjusting unit for adjusting the first angle,
   wherein the adjusting unit is coupled to the first and second hoop band portions, wherein the adjusting unit has a torque application means for applying an adjustable torque.

2. An earphone as set forth in claim 1 wherein the torque application means have portions for receiving an adjusting element which couples the torque application means together.

3. An earphone as set forth in claim 2 wherein the adjusting element is in the form of an adjusting screw.

4. An earphone as set forth in claim 3 wherein the adjusting screw has at least one actuating portion for rotation of the adjusting screw.

5. An earphone as set forth in claim 4 wherein the adjusting screw has two lateral actuating portions for rotation of the adjusting screw.

6. An earphone as set forth in claim 4 wherein the adjusting screw has a central actuating portion for rotation of the adjusting screw.

7. An earphone as set forth in claim 2 wherein the adjusting element is in the form of an electrically operable linear actuator.

8. An earphone as set forth in claim 1 wherein the hoop band defines a plane and the first angle is adjustable in the plane by the adjusting unit.

9. A headset comprising:
a hoop band for receiving at least one electroacoustic reproduction transducer which has
at least a first and a second hoop band portion which are respectively arranged at a first angle relative to each other,
wherein at least the first and the second hoop band portions are rotatably connected together by means of a rotary joint, and
at least one adjusting unit for adjusting the first angle,
wherein the adjusting unit is coupled to the first and second hoop band portions, wherein the adjusting unit has a torque application means for applying an adjustable torque.

10. Ear protection comprising:
a hoop band which has
at least a first and a second hoop band portion which are respectively arranged at a first angle relative to each other,
wherein at least the first and the second hoop band portions are rotatably connected together by means of a rotary joint, and
at least one adjusting unit for adjusting the first angle,
wherein the adjusting unit is coupled to the first and second hoop band portions wherein the adjusting unit has a torque application means for applying an adjustable torque.

11. An earphone comprising:
a hoop band for receiving at least one electroacoustic reproduction transducer having at least a first and a second hoop band portion which are respectively arranged at a first angle relative to each other,
wherein at least the first and the second hoop band portions are rotatably connected together by means of a rotary joint, and
at least one adjusting unit for adjusting the first angle,
wherein the adjusting unit is coupled to the first and second hoop band portions, wherein the adjusting unit comprises an adjusting element in a form of an adjusting screw arranged in parallel to the rotary joint.

* * * * *

UNITED STATES PATENT AND TRADEMARK OFFICE
CERTIFICATE OF CORRECTION

PATENT NO.         : 8,204,267 B2
APPLICATION NO.    : 12/489790
DATED              : June 19, 2012
INVENTOR(S)        : Leske et al.

It is certified that error appears in the above-identified patent and that said Letters Patent is hereby corrected as shown below:

In the Drawings:

In the FIGURES, FIG. 1: please replace the first instance of "22" (the left one) with a "21," as described and supported in the Detailed Description. The amendment is depicted in the replacement figures filed herewith.

In the FIGURES, FIG. 1: please include the line leading from "50" to the appropriate feature, as described and supported in the Detailed Description. The amendment is depicted in the replacement figures filed herewith.

In the Specification:

In the DETAILED DESCRIPTION, Column 3, Line 26: please delete "element 41 and 51" and insert --elements 41 and 51--.

In the DETAILED DESCRIPTION, Column 3, Line 32: please delete "portion 110, 120" and insert --portions 110, 120--.

In the DETAILED DESCRIPTION, Column 3, Line 52: please delete "element 41 and 51" and insert --elements 41 and 51--.

In the DETAILED DESCRIPTION, Column 3, Line 57: please delete "portion 110, 120" and insert --portions 110, 120--.

Signed and Sealed this
Fourth Day of September, 2012

David J. Kappos
*Director of the United States Patent and Trademark Office*